United States Patent [19]
Greenwood

[11] 3,741,696
[45] June 26, 1973

[54] SEGMENTED TIRE MOLD
[75] Inventor: Alan Greenwood, Kent, Ohio
[73] Assignee: The Goodyear Tire & Rubber Company, Akron, Ohio
[22] Filed: June 1, 1971
[21] Appl. No.: 148,356

[52] U.S. Cl. .................................. 425/47, 425/46
[51] Int. Cl. ...................... B29h 5/08, B29h 17/00
[58] Field of Search ................. 425/23, 39, 46, 47, 425/32, 43, 45

[56] References Cited
UNITED STATES PATENTS

| | | | |
|---|---|---|---|
| 3,460,197 | 8/1969 | Cantarutti et al. | 425/46 |
| 3,464,090 | 9/1969 | Cantarutti | 425/46 X |
| 3,505,447 | 4/1970 | Billes | 425/47 X |
| 3,337,918 | 12/1967 | Pacciarini et al. | 425/39 |
| 2,372,217 | 3/1945 | MacMillan | 425/46 |
| 2,987,770 | 6/1961 | Powell | 425/23 |
| 906,256 | 12/1908 | Mell | 425/46 |
| 3,057,011 | 10/1962 | Knox | 425/46 |

FOREIGN PATENTS OR APPLICATIONS

| | | | |
|---|---|---|---|
| 1,440,604 | 4/1966 | France | 425/43 |
| 1,239,461 | 4/1967 | Germany | 425/45 |
| 1,195,057 | 5/1959 | France | 425/32 |
| 1,169,118 | 4/1964 | Germany | 425/45 |
| 1,160,606 | 8/1960 | Germany | 425/45 |

Primary Examiner—J. Howard Flint, Jr.
Attorney—F. W. Brunner and Robert S. Washburn

[57] ABSTRACT

A segmented tire mold having two sidewalls, a plurality of radially movable segments and a pair of internally conical casing rings cooperable with the segments to close the mold as the rings are urged coaxially together in a pot heater. A fixture cooperates with the mold to facilitate assembling or disassembling the mold. In the fixture, the casing rings can be moved axially away from the respective sidewalls and from each other, freeing the segments to be moved outwardly by individual screw jacks operated by a common motor.

29 Claims, 8 Drawing Figures

SEGMENTED TIRE MOLD

The foregoing abstract is not to be taken as limiting the invention of this application, and in order to understand the full nature and extent of the technical disclosure of this application, reference must be made to the accompanying drawings and the following detailed description.

This invention relates to molding of tires and particularly to molding of tires of great size, such as tires known as off-the-road or earthmover tires.

BACKGROUND OF THE INVENTION

It has been common practice to mold tires, even those of great size, in molds having two parts with a parting line extending circumferentially about the tire in a plane perpendicular to the axis at or near the mid-circumferential plane of the tire. More recently, it has become the practice to employ molds in which that part of the mold engaging the tread is divided into segments movable generally radially with respect to the tire axis toward and away from the tread, and it is generally, although not universally, accepted that the sidewall molding members of the mold should be positioned at least approximately at their final molding position before the segments of the tread forming mold ring are moved into engagement with the tread. This latter described process has been particularly advantageous in the molding of tires wherein a relatively inextensible member surrounds the carcass in such a manner as to prevent any large change in the circumference of the tire prior to or during cure thereof.

Because the satisfactory curing of large tires involves the use of a fluid pressure therewithin in excess of about 15 atmospheres and the consequent very large axial and radial forces acting outwardly, molds for such tires require massive presses and/or complicated multiple fastening means. Such structures are, therefore, necessarily high in initial cost, in maintenance cost, and in the number of man hours required in operation of placing an uncured tire therewithin and subsequently opening the mold to remove the cured tire therefrom.

SUMMARY OF THE INVENTION

It is an object of the present invention to develop further and to refine the advantages of the prior art described while avoiding the difficulties and disadvantages attendant therein.

A specific object of the invention is to provide a tire mold apparatus completely free of cumbersome, expensive, and complicated lever systems, and further a mold not requiring fastening means such as bolts, clamps, or pin-link arrangements subject to excessive wear.

A further object is provision of a tire mold for large tires which can be expeditiously assembled and disassembled and which mold is particularly adapted to resist radial forces resulting from high fluid pressure therewithin while a tire therein is cured in a conventional pot heater.

The foregoing objects and other objects which will become more fully apparent as the description herein proceeds are accomplished in accordance with the invention by a mold having an upper and a lower sidewall mold member each having a sidewall molding surface with at least the lower member having a plurality of guideways extending inwardly of or from the mold perimeter; a plurality of tread molding segments providing in one arrangement thereof a circumferentially continuous tread molding ring, the individual segments whereof are free of attachment to one another. Each segment has an extending tongue fixed to at least one of its upper and lower surfaces which tongue is slidable in a respectively associated one of said guideways. An upper and a lower casing ring each have a sloping wall portion cooperable with an axially tapering outer surface of the respective tread segments.

In accordance with a further aspect, the invention provides apparatus for assembling the multi-part tire mold described with an uncured tire to be molded therewithin which features a base having a plurality of upwardly extending pillars which support the lower sidewall mold member and permit the lower casing ring to be moved selectively upwardly to envelop said segments or downwardly to a position clear of such segments.

DRAWINGS

The invention will be more fully understood from a consideration of the following description of specific embodiments thereof which makes reference to the attached drawings in which:

FIGS. 3–8 depict schematically the use of the fixture and mold in FIGS. 1 and 2 in enclosing a tire within the mold and in removing a tire from the mold in accordance with the invention.

SPECIFIC EMBODIMENT

Figure 1:
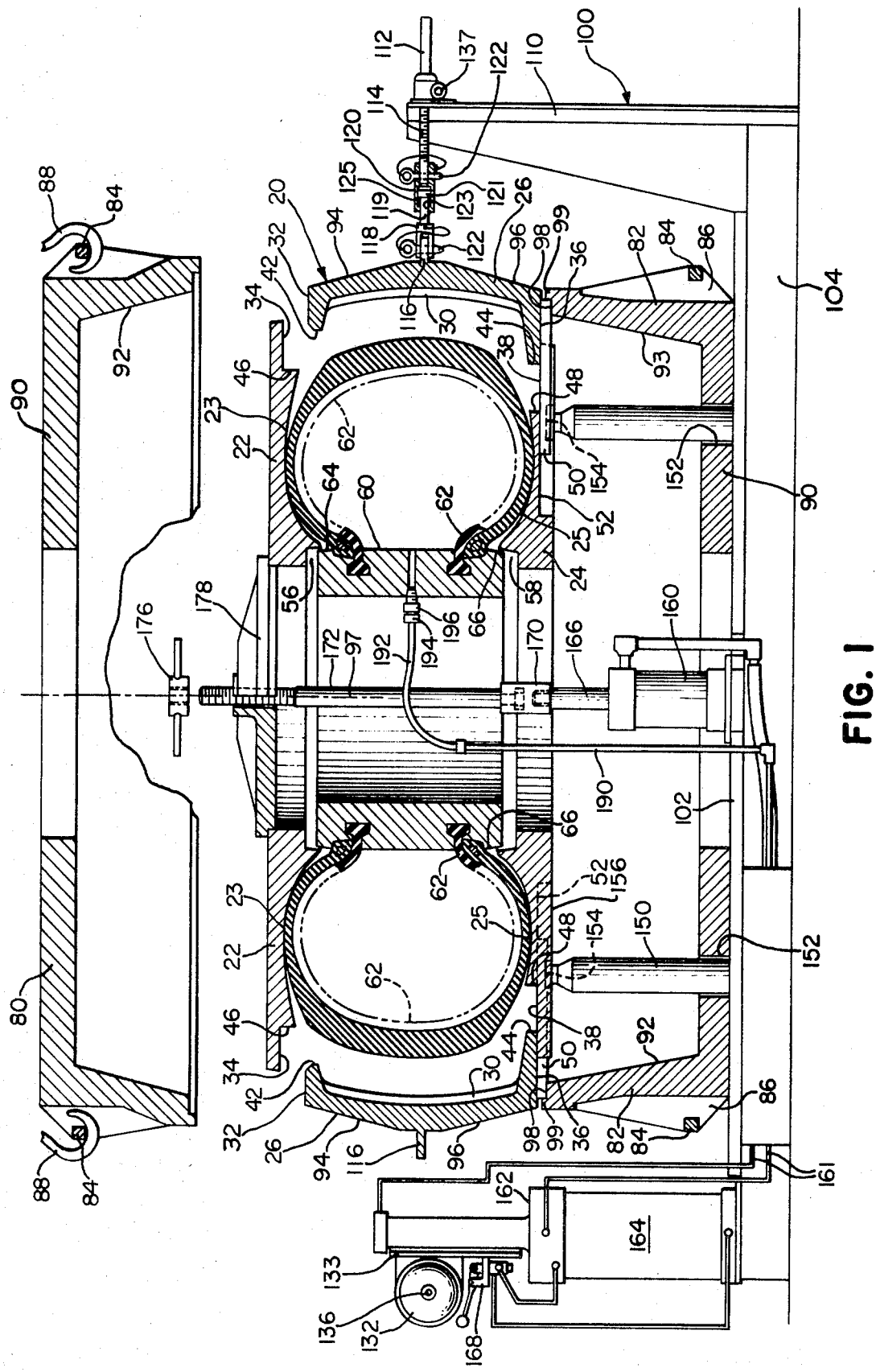
FIG. 1 is a view in sectional elevation of a tire mold and an assembly fixture according to the invention.
Figure 2:
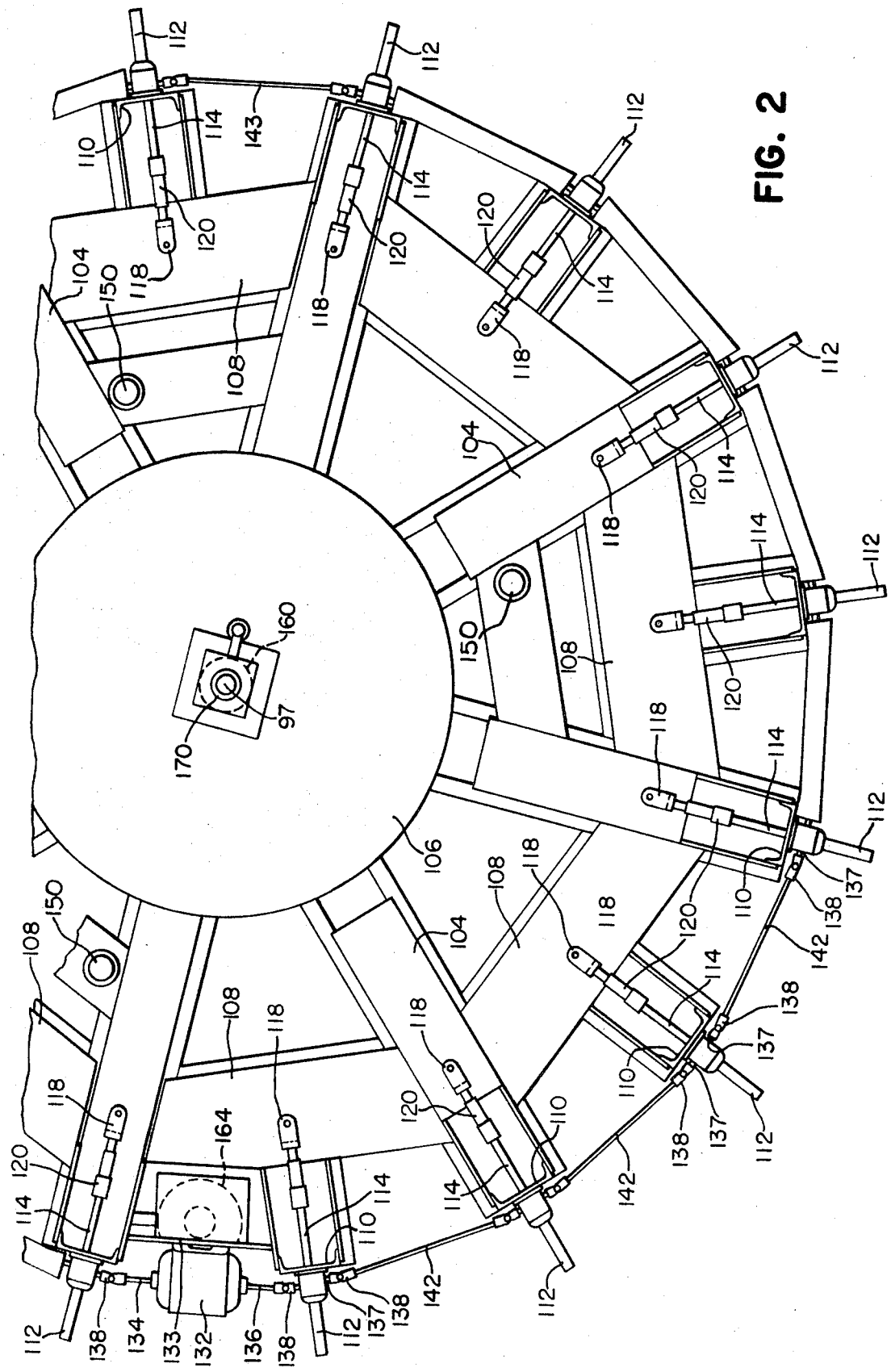
FIG. 2 is a plan view of the fixture of FIG. 1.
Figure 3:
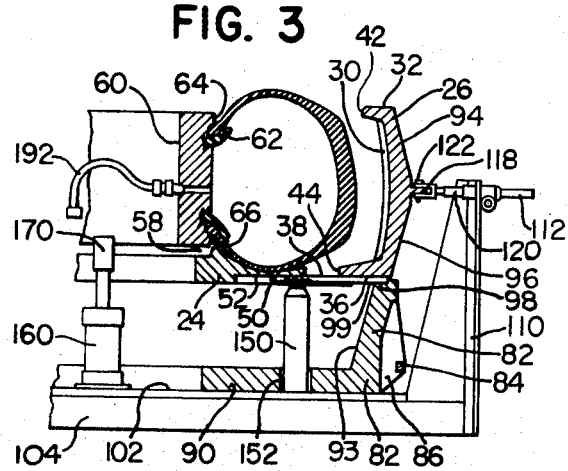

Referring to FIGS. 1 and 2, a preferred embodiment in accordance with the invention provides a multi-part tire mold 20 comprising an upper sidewall mold member 22, a lower sidewall member 24, and a plurality of tread molding segments 26, providing in one arrangement thereof a circumferentially and axially continuous tread molding ring. Each segment 26 is free of attachment to any other segment. The sidewall members 22 and 24 have opposed tire molding surfaces 23 and 25, respectively, which cooperate with tread molding surfaces 30 of the respective segments 26 to form a tire molding cavity.

Each individual segment has an upper plane surface 32 which is slidable on an annular plane radial surface 34 formed on the upper member 22, and a lower plane surface 36 slidable on a plane radial annular surface 38 formed on the lower sidewall mold member 24. The surfaces 34 and 38 are disposed radially and axially outwardly of the respective surfaces 23 and 25.

The tread ring comprises sixteen segments 26. The radially inner surface 30 of each has tread pattern suitably formed to provide the desired non-skid configuration in the tread of the tire to be molded. When the tread ring is in its fully closed arrangement, the segments 26 are each in abutting contact with the immediately adjacent segments on either side and its radially inward surfaces 42 and 44, respectively, abut the surfaces 46 and 48 on the upper and lower sidewall members 22 and 24 between the respective molding surfaces 23 and 25 and the radial surfaces 34 and 38.

Secured to the surface 36 of each of the segments 26 is a tongue 50 of generally rectangular cross-section extending longitudinally parallel to a central radius of the particular segment 26. The tongue 50 is slidable in a guideway 52 of generally rectangular cross-section which is formed in the lower sidewall member 24.

As may be seen in FIG. 1, each sidewall member 22 and 24 extends radially toward the axis of the mold inwardly of the bead portion of the tire to accommodate annular recesses 56 and 58, which recesses are adapted to locate a central core assembly 60. The core assembly 60 comprises a plurality of rings which provide, when suitably assembled, locating seats for the respective bead portions of the tire to be cured, and for retention of an elastic impermeable bladder 62, for shaping the tire. Such assemblies are well known in the art and, not being part of the invention, do not require more extensive description. The core assembly is, however, provided with coaxial locating pilots 64,66 engageable, respectively, in the recesses 56,58 to ensure suitably coaxial assembly of the tire with the sidewall members 22 and 24. To move and hold the respective segments 26 radially inwardly to close mold 20 for curing the tire, an upper and lower casing ring 80 and 82, respectively, surround the segments and are movable axially of the sidewall members. Each has a plurality of bars 84 each extending between and formed integrally with adjacent pairs of buttress ribs 86 in such a manner as to provide convenient attachment and detachment for crane hooks 88. Neither casing ring is fastened in any way to either side mold member or to the respective segments. Each of the casing rings 80 and 82 comprises an annular plate portion 90 and a sloping wall portion 92 and 93 respectively, the inner surfaces of which are formed as truncated cones coaxial with the mold, having slopes of from about 7° to about 17° and preferably between 10° and 15°. The radially outer surfaces 94,96 of the tread ring segments 26 are tapered or sloped at angles respectively equal to the slopes of the respective wall portions 92,93 and convergent toward the mold axis 97 outwardly of the mid-circumferential plane of the mold. The slopes of the respective surfaces 94,96 which also are preferably conical have angles with respect to the axis of the mold equal to the respective angles selected for the sloping wall portions 92,93. The wall portions 92,93 and the surfaces 94,96 preferably, but not necessarily, have the same slant height and are generally symmetrical with respect to the mid-circumferential plane of the mold.

The sloping wall portion 93 of the ring 82 terminates at a plane radial annular surface 98 which provides rest means upon which the respective segments 26 can be supported when they are in their retracted or open position as illustrated in FIG. 1. An annular abutment ring 99 projecting coaxially upwardly from the surface 98 provides stop means engageable with the outward ends of the respective tongues 50 to limit the radially outward movement of the segments 26.

The invention includes also apparatus for expeditiously assembling and disassembling the multi-part mold 20 in the form of a fixture 100. The fixture 100 includes a weldment comprising a base 102 having sixteen equally spaced radial members 104, a generally circular central floor plate 106 and a plurality of bridge plates 108.

A plurality of upright posts 110 are fixed respectively to the radial members 104 outwardly of the periphery of the mold 20. Each of the posts 110 supports a screw jack 112, the screw 114 of which extends radially in, or at least parallel to, the midcircumferential plane of the mold 20 and in the axial plane bisecting the respective segment 26 to provide push-upll means for moving each respective segment radially toward and away from the tire. Coupling means by which the screw 114 can be connected and disconnected from a lug 116 fixed upon or formed integrally with the respective segment 26 comprises a clevis 118 and a sleeve 120. The clevis is connected to the lug 116 by a captive pin 122 which can be placed in or removed from suitably aligned holes in the clevis arms and in the lug. The sleeve is mounted on the screw 114 and there secured by a similar captive pin 122 or its equivalent so that the coupling means is readily mounted on or removed from the respectively associated lug and screw.

In order to provide two working lengths of the coupling means, the clevis 118 has a shank 119 having an enlarged head 121 which are slidable respectively in a bore 123 and a counterbore 125 in the sleeve 120. The arrangement is such that the coupling means is extended to its greater working length when the screw jack 112 pulls the segment radially away from the tire and enables the coupling means to be collapsed to its shorter length to facilitate removal of the coupling means and replacement without further movement of either the associated segment 26 or the screw 114. During radially inward movement of the segment 26, the screw 114 engages the head 121 with the coupling means at its shorter working length. As will be apparent, any equivalent device could be employed in lieu of the coupling means described, and which will provide the advantage of requiring only a single pair of conventional stops to limit movement of the screw 114.

To actuate the screw jacks 112 an electric motor 132 having two driving shafts 134 and 136 is mounted on a bracket 133 extending between an adjacent pair of the posts 110. Each jack 112 has an input shaft 137 extending outwardly in two directions. A flexible coupling 138 is mounted on each end of each shaft 137. The two jacks immediately adjacent the motor 132 are connected by the respective couplings 138 to the output shafts 134,136 of the motor. The remaining pairs of the flexible couplings 138 are each connected, respectively, by a floating shaft 142. The driving connection provided by the floating shaft 143 and respectively associated flexible couplings 138 may be omitted between the pair of jacks 112 located about 180 degrees from the drive motor 132.

Three pillars 150 standing upright on the base, radially equidistant from the mold axis 97 but located at unequal angles thereabout, support the mold 20 with its midcircumferential plane at a height corresponding to the height of the screws 114 above the base 102. The lower casing ring 82 is provided with openings 152 accommodating the pillars therethrough so that the ring 82 can be moved coaxially of the fixture 100 toward and away from a lower mold member 24 supported by the pillars 150. A shallow annular groove 154 formed in the lower wall 156 of the sidewall member 24 receives the upper ends of the pillars 150 to locate the mold assembly 20 in suitable concentricity with the fixture. Alternatively, the groove 154 can be replaced by a plurality of recesses in which the ends of the pillars are received.

In order to assist the weight of the upper sidewall mold 22 to move downwardly toward the lower sidewall member 24 with a tire to be molded therebetween, a hydraulic cylinder 160 is mounted centrally and vertically of the fixture and supplied with oil under pressure by way of the oil pipes 161 from a conventional air/oil booster system 162, the air cylinder 164 of which is connected to conventional shop air supply. The movement of the piston rod 166 of the cylinder is controlled by a valve 168. An internally threaded sleeve 170 fixed on the piston rod 166 releasably connects by a bayonet-type connector an extension rod 172, the opposite end of which extends through a central hole in a pressure plate or clamp 178 to receive a nut 176. The clamp 178 locates in a central opening 180 of and bears on the upper surface of the mold plate 22. The nut, clamp, and extension rod are removable when not being used to draw the upper sidewall mold member 22 downward to close the mold.

For convenience, the fixture 100 is also provided with an air pipe 190 having a flexible portion 192 at its upper end provided with a coupling 194 which can be attached to a conventional inlet valve 196 to supply additional air as required into the bladder 62. This flexible portion will be disconnected prior to removal of the assembled mold from the fixture to the conventional pot heater in which the tire will be cured. The term "pot heater" herein means and is intended to mean a conventional closed vulcanizing or curing vessel in which a tire mold is engaged by a hydraulically operated ram and heated by steam at an elevated pressure.

OPERATION

The operation of the tire mold 20 itself, as well as operation of the fixture 100 with the mold, will have become apparent to persons skilled in the art from the foregoing description of the apparatus and may be briefly summarized as follows.

Referring to FIGS. 3-8, the fixture 100 is placed in a position to be serviced by a suitable crane. The mold 20 supported by the lower casing ring 82 is lowered into a position, seen in FIG. 3, of rest upon the base 102 of the fixture so that the lower sidewall member 24 is supported coaxially of the fixture on the pillars 150, the upper ends of the pillars being received in the groove or recesses 154, and such that the guideways 52 are aligned radially with the respective screw jacks 112. The casing ring 80 and the sidewall members 22 are removed. The coupling sleeves 120 and clevises 118 are mounted in the screws 114, which are then moved radially inwardly by energizing the motor 132. The clevises 118 are then connected to the respective lugs 116; the motor 132 then being activated to move the respective segments 26 radially outwardly to the limit set by the stops 99. The engagement of the outer ends of the tongues 50 with the stops 99 prevents the segment surface 44 from moving outwardly beyond the perimeter of the surface 38. The tongue 50 remains then at least partially within the guideway 52.

The tire and the core assembly 60, with the bladder 62 deployed within the tire, is disposed with the tire sidewall on the lower sidewall member 24 so that the pilot 66 is in registry with the recess 58.

Figure 4:
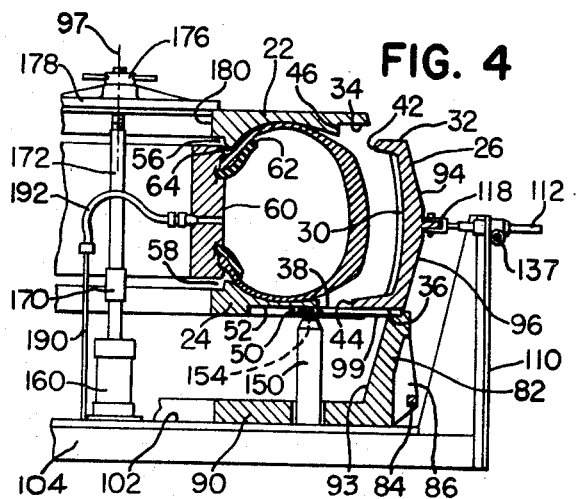

As illustrated in FIG. 4, the upper sidewall member 22 is then placed upon the tire with the recess 56 located coaxially with the pilot 64. The extension rod 172 is connected in the coupling 170; the clamp 178 and nut 176 assembled and positioned in registry with the opening 180. The cylinder 160 is actuated to urge the member 22 downwardly to seat the core 60 in the respective recesses 56 and 58 and to compress the tire to at least approximately its final section width. It will be appreciated that the uncured tire is at least partially inflated.

Referring to FIG. 5; with the tire held between the respective sidewall members 22 and 24, the motor 132 is energized to drive the screws 114 radially inward, moving the respective segments 26 into position such that the inner face 30 of the segments is in superficial contact with the tread portion of the uncured tire, the tongues 50 being guided in the guideways 52 to insure suitable radial movement of the segments. The jacks 112, it will be observed, are required only to move the segments inwardly to contact the tire, not to impress a pattern therein or to provide a molding pressure. Hence, the jacks 112 can be of relatively light construction and inexpensive. After the segments have been moved inwardly the clevis 118 is disconnected from the lug 116, the screws 114 are moved outwardly, and the sleeves 120 disconnected and removed. The nut 176, the clamps 178, and the rod 172 are also removed, tending to maintain the member 22 against the tire.

Figure 6:
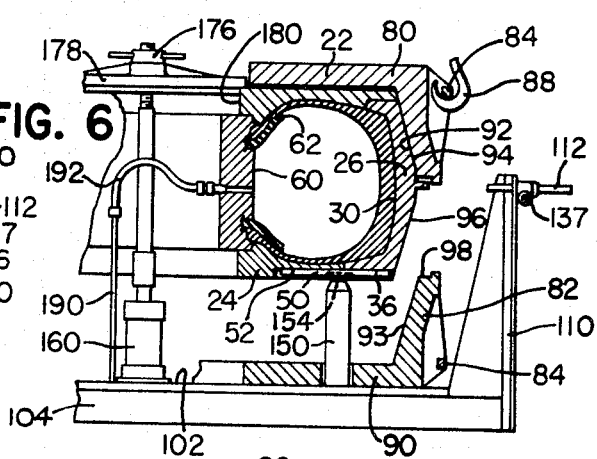

With reference to FIG. 6; the overhead crane, being provided with hooks 88 suitably spaced by a spreader or strong back (not shown) to engage the lift bars 84, places the upper casing ring 80 on the mold. The sloped wall portion 93 engages the outer surface 94 of the respective segments 26 tending to close further the segments 26 to impress the tread pattern at least partially into the tread of the uncured tire under the influence of the weight of the ring 80.

Figure 7:
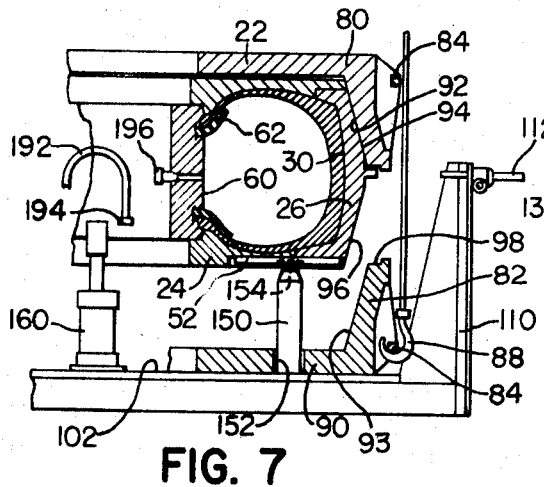
Figure 8:
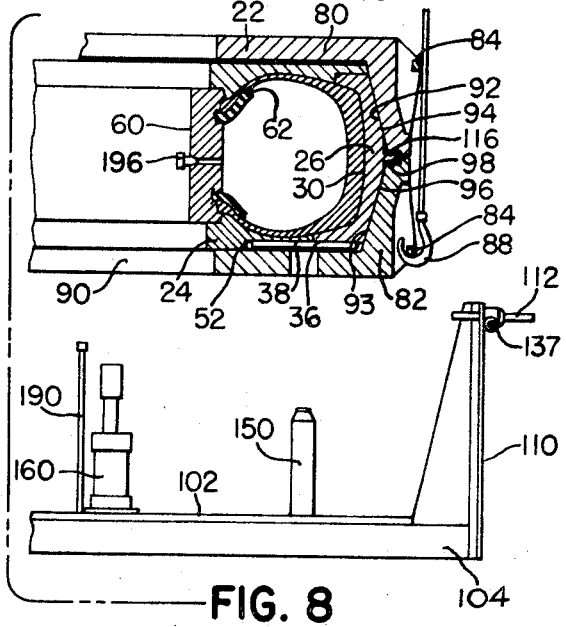

Turning to FIGS. 7 and 8; the crane hooks are engaged to lift first the lower casing ring 82 to engage first the surfaces 93 and 96 and thus lift the entire mold assembly 20 from the fixture 100 for transport to the pot heater. The weight of the tire and the parts of the mold so carried in the lower casing ring 82 tend to complete the closure of the mold cavity by wedging the segments inwardly as the upper ring 80 moves toward the lower ring 82. In any event, complete closure of the mold cavity is ensured by the action of the hydraulic ram of the pot heater (not shown).

After the tire has been cured, the pot heater is opened, the internal fluid pressure within the bladder having been suitably reduced, and the mold 20 is again brought to the fixture 100, the upper casing ring 80 being removed there or from the mold while the same is at the pot heater. The mold is lowered into position, the pillars 150 entering the openings 152 in the lower casing ring 82 to engage the lower sidewall mold member 24 to support the mold while the lower casing ring 82 is further lowered to the base of the fixture. The screws 114 are moved to their radially inward positions, and the clevis and sleeve connected to the lug and screw respectively of each segment. The motor 132 being energized, the screw jacks are operated to withdraw each segment radially outwardly from the tire to the retracted position, the tongue 50 engaging the stop ring 99. The upper sidewall mold member is then lifted off by the crane, the now cured tire, as well as the core assembly, are lifted from the mold.

While certain representative embodiments and details have been shown for the purpose of illustrating the invention, it will be apparent to those skilled in the art that various changes and modifications may be made therein without departing from the spirit or scope of the invention.

What is claimed is:

1. A tire mold for molding and curing a tire therewithin and adapted for preassembly and disassembly in a mold assembly fixture independent and apart from a pot heater in which said mold and tire are together subjected to heat and pressure, said mold comprising a first and a second sidewall mold member each having a tire sidewall molding surface, a plurality of tread molding segments providing in one arrangement thereof a circumferentially continuous tread molding ring, a first and a second casing ring, each said casing ring being freely movable relative to its respectively associated sidewall mold member, each said casing ring having an interior surface of conical form coaxial with the mold axis and each said segment having a pair of oppositely inclined surfaces the slant angles of which are respectively equal to the slant angles of and slidably engageable with the corresponding conical surfaces of the associated said casing ring, said first and second sidewall member each being movable independently of said segments and of said casing rings to form said tire at least approximately to its final width while the tread portions of the tire remain out of contact with said segments.

2. Apparatus for preassembling a multipart tire mold apart from the pot heater in which the mold is to be used, said apparatus including an independent fixture comprising a base having fixed thereto a plurality of mold sidewall member supporting pillars extending upwardly therefrom the upper ends of which terminate in a common plane perpendicular to the axis of the mold at rest on said pillars, said mold having a plurality of tread mold segments, an upper and a lower casing ring, and an upper and a lower sidewall mold member each freely separable from its associated casing ring and each having a tire sidewall molding surface, each said casing ring having an annular plate portion and a sloping wall portion extending axially therefrom slidably to engage said segments, said plate portion of at least said lower ring having a plurality of openings therethrough to accommodate said pillars during relative coaxial movement of said casing ring between said lower sidewall mold member and said base longitudinally of the pillars.

3. Apparatus as claimed in claim 1, wherein at least said lower sidewall mold member has a plurality of guideways extending radially inwardly of the mold periphery, said plurality of tread molding segments providing in one arrangement thereof a circumferentially continuous tread molding ring, each said segment having a tongue affixed to at least one of its upper and lower surfaces to extend normal to the axis of the mold and which tongue is slidable in a respectively associated one of said guideways.

4. Apparatus as claimed in claim 3, said lower casing ring having stop means engageable with respective said tongues to limit radially outward movement of said segments.

5. Apparatus as claimed in claim 2, said fixture including a plurality of posts affixed to and extending upwardly of said base and spaced radially outwardly of the periphery of said casing rings sufficiently to allow free vertical movement of said rings, each of said posts respectively being associated with one of said segments, and a plurality of push-pull means mounted one on each of said posts and operable to connect releasably with and to move said segments radially of the mold axis and inwardly to a limit of movement which is less than that required fully to close the tread ring independently of said casing rings.

6. Apparatus as claimed in claim 5, wherein at least said lower mold member is provided with recess means for engaging said pillars.

7. Apparatus as claimed in claim 5, including coupling means detachably connectable between each said push-pull means and a respectively associated segment.

8. Apparatus as claimed in claim 7, said push-pull means each comprising a screw jack having a screw extending and movable radially of the mold axis.

9. Apparatus as claimed in claim 8, including driving means, each said screw jack having a right-angle drive, and means connecting each said drive to said driving means.

10. Apparatus as claimed in claim 8, wherein said coupling means has a first working length effective for pulling and a second working length effective for pushing the respectively associated segment radially of said mold members.

11. Apparatus as claimed in claim 2, further comprising means operable independently of any movement of said casing ring for urging said upper and lower sidewall members relatively toward each other while said tire is between said members.

12. Apparatus as claimed in claim 11, wherein said means includes a clamp, a hydraulic cylinder, and a removable tie rod connectable therebetween.

13. Apparatus as claimed in claim 12, said cylinder being mounted upon said base and extending coaxially upwardly therefrom, said clamp being removably engageable with a coaxial bore and with the outer wall surface of said upper sidewall mold member.

14. Apparatus for molding a curable tire comprising in combination a multipart tire mold for use in a pot heater in which said mold and tire are subjected to heat and pressure and a fixture disposed apart from said pot heater for preassembling and for disassembling said mold with such tire therein apart from and independently of said pot heater, said mold including a first sidewall mold member, a second sidewall mold member removably disposable in coaxially opposed relation to said first member with such tire between said first and second mold members, a tread mold ring engageable with said first and second members to form a tire molding cavity and comprising a plurality of segments each independently and freely separable from the others, said fixture including a fixed base, means fixed upon said base for engaging said first member and for supporting the same coaxially of and spaced above said base, a plurality of mold casing means separate and independent of said sidewall mold members and cooperable with said segments in response to movement of said casing means relative to the segments to move said segments radially inwardly of said mold, one of said casing means being movable coaxially of and between said first member and said base.

15. Apparatus as claimed in claim 14, said fixture further including independently operable means separate and apart from said mold casing means for urging said second member coaxially toward said first member while said tire is between said members.

16. Apparatus as claimed in claim 15, said means for urging comprises a hydraulic cylinder mounted coaxially of said fixture and tension means removably connectable between said cylinder and said second member.

17. Apparatus as claimed in claim 16, said tension means comprising a clamp, a nut bearing on said clamp, means on said second sidewall member to engage said clamp, and an extension rod removably coupled to the piston rod of said cylinder and through said clamp into threaded engagement with said nut.

18. Apparatus as claimed in claim 16, said fixture further including means for supplying high pressure fluid to said cylinder, and air pressure means connected to the last said means to increase the fluid pressure therewithin.

19. Apparatus as claimed in claim 14, said means for supporting said first sidewall member comprising a plurality of pillars mounted on said base, said one casing means having an annular floor provided with a plurality of openings each accommodating one of said pillars for movement of said casing means relatively of and between said base and sidewall member.

20. Apparatus as claimed in claim 19, wherein said first member is provided with locating means for receiving the upper ends of said pillars to locate said first member with respect to the axis of said fixture.

21. Apparatus as claimed in claim 14, wherein said tire is mounted on a core for placement as a unitized assembly into said mold, and which core includes a bladder distensible within said tire, and further comprising coaxial cylindrical pilots on said core, and means provided in each said first and second member to locate respectively said pilots and said tire coaxially with respect to said members and said mold.

22. Apparatus as claimed in claim 14, each said casing means comprising a floor and a sloping wall extending peripherally about and axially from said floor, each said wall having wedge means for urging said segments radially inwardly, each segment having wedge means cooperable with the first said wedge means during movement of said casing means coaxially toward the respectively associated sidewall members.

23. Apparatus as claimed in claim 22, each said wedge means includes a surface of a cone coaxial with said mold.

24. Apparatus as claimed in claim 23, each said surface of the respective said wedge means incline equally with respect to a mid-circumferential plane of said mold.

25. Apparatus as claimed in claim 14, in which one said casing means is provided with rest means cooperable with respective segments to support the same in a radially outwardly retracted position thereof.

26. Apparatus as claimed in claim 25, said first member being provided with a plurality of guideways extending radially inwardly from the periphery thereof, each said segment having a tongue secured to one radial face thereof and slidable in a respectively associated one of said guideways.

27. Apparatus as claimed in claim 14, said fixture further including a plurality of upright posts equally spaced about and rigidly secured to said base radially outwardly of the periphery of said casing means, a plurality of push-pull means effective independently of the movement of said casing means mounted respectively one on each of said posts and each respectively temporarily connectable with one of said segments for moving the same radially relatively of but less than sufficient to close said mold cavity.

28. Apparatus as claimed in claim 27, said push-pull means each including a screw jack having a right-angle drive, and common drive means connected to drive each said jack.

29. Apparatus as claimed in claim 27, further including coupling means comprising a sleeve and a clevis slidable in said sleeve and detachably connected between each said screw jack and a respectively associated segment.

* * * * *